United States Patent Office 3,050,438
Patented Aug. 21, 1962

3,050,438
ORGANOPHOSPHORUS INSECTICIDES
Geert C. Vegter, Amsterdam, Netherlands, and Anthony M. Thrush, Ickenham, England, assignors to Shell Oil Company, New York, N.Y., a corporation of Delaware
No Drawing. Filed Apr. 5, 1960, Ser. No. 19,983
Claims priority, application Great Britain June 2, 1959
18 Claims. (Cl. 167—22)

This invention relates to novel phosphorus-containing esters, valuable as insecticides, and suitable in particular for use as plant-protecting agents.

These new insecticides are the S-acyloxyaliphaticthioaliphatic esters of O,O-diesters of phosphorothionic acids, including phosphorothiolothionic acids, being characterized by the structure of an acyloxyalkylthioalkyl radical bonded via an oxygen or a sulfur atom to the phosphorus atom of phosphorothionic acid. The new insecticides are characterized by the structural formula:

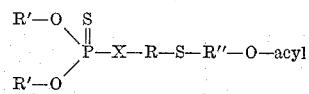

wherein R and R'' each represents a divalent aliphatic radical, each of R' taken singly represents a monovalent organic group—which may be the same group, different groups of the same kind, or different kinds of groups—which is the residue of an alcohol, R'OH, and taken together in combination represent a divalent organic group which is the residue of a glycol HO—R'—OH, X represents oxygen or sulfur, and "acyl" represents an acyl residue of an acid.

Preferably, R' represents hydrocarbon of up to ten carbon atoms—that is to say, each of R' may be a separate monovalent hydrocarbon group, both of the groups together containing up to 10 carbon atoms, or both of R' together may be a single divalent hydrocarbon group of up to 10 carbon atoms—or such hydrocarbon groups substituted by one or more nitro groups, one or more halogen atoms or one or more alkoxy groups of up to four carbon atoms. The monovalent groups may suitably be straight chain, branched chain or cyclic in configuration; they may be saturated, olefinically unsaturated or aromatically unsaturated. Preferably, they are free from acetylenic unsaturation. Suitable groups thus include the alkyl groups, the cycloalkyl groups, alkylene groups, aralkyl groups, alkaryl groups, aryl groups, alkenyl groups, alkadienyl groups, cycloalkenyl groups, alkenylene groups, aralkenyl groups, alkenylaryl groups, and the like. The most useful of the new class of compounds are believed to be those wherein R' represents saturated aliphatic hydrocarbon—that is, alkyl where each R' is a separate monovalent group, or alkylene where both of R' together represent a single divalent group—of up to eight carbon atoms, the phenyl group, a nitrophenyl group, or a halophenyl group. Where both of R' together represent an alkylene group, it is preferred that there be from two to three carbon atoms in the chain bonding together the indicated oxygen atoms.

The aliphatic groups represented by the symbols R and R'' respectively, preferably contain only carbon atoms in the aliphatic chain bonding the atom, X, to the indicated sulfur atom, and bonding the indicated sulfur atom to the indicated oxygen atom. These carbon atoms may all be saturated carbon atoms, or two or more may be olefinically unsaturated; preferably, none are acetylenically unsaturated. Where olefinic unsaturation is present in the chain, preferably one olefinically unsaturated pair of carbon atoms consists of the alpha and beta carbon atoms relative to the atom, X, and relative to the indicated sulfur atom. The carbon chain may be substituted, the preferred substituents being selected from halogen atoms, the cyano group, the nitro group, amino groups and monovalent hydrocarbon substituent groups such as are represented by the symbol R'. Desirably, the group R contains at least two but not more than about twelve carbon atoms, with at least two and no more than six carbon atoms on the chain bonding together the atom X, and the indicated sulfur atom. Desirably, the group R'' contains no more than twelve carbon atoms, with no more than six carbon atoms in the chain bonding together the indicated sulfur and oxygen atoms. It is preferred that the group R and the group R'' each contain no more than about six carbon atoms, with no more than four carbon atoms in the chain.

In the formula, "acyl" is the acyl group of an acid.

By "acyl group" is meant the organic radical derived from an organic acid by the removal of the hydroxyl group. In the case of a carboxylic acid, $R^0$—C(O)—OH, the acyl group is $R^0$—C(O)—, while in the case of a sulfonic acid, $R^0$—$SO_2$—OH, the acyl group is $R^0$—$SO_2$—. Suitably, the acyl group may be that of an aliphatic carboxylic acid, in aliphatic sulfonic acid ($R^0$=aliphatic), a haloaliphatic carboxylic acid, a haloaliphatic sulfonic acid ($R^0$=haloaliphatic), a phenyl carboxylic acid, a phenyl sulfonic acid ($R^0$=phenyl), or a substituted phenyl carboxylic acid, a substituted phenyl sulfonic acid ($R^0$=substituted phenyl, preferred substituents being halogen, nitro and alkoxy of up to four carbon atoms), an aliphatic carbonic acid ($R^0$=aliphaticoxy), a phenyl carbonic acid ($R^0$=phenyloxy), an amino acid ($R^0$=aminoalkylene, or, preferably, $(R_3)_2$N-alkylene, wherein $R_3$=H or R'), a carbamic acid ($R^0$=amino, or, preferably, $(R_3)_2$N), phosphoric acid, a monoester or diester thereof

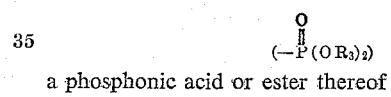

a phosphonic acid or ester thereof

or a phosphinic acid

or their sulfur analogs. Preferably, the acyl group contains no more than ten carbon atoms.

In these acyl groups, the aliphatic groups preferably contain only carbon in the chain, and may be either saturated or olefinicially unsaturated; preferably, they are free from acetylenic unsaturation. Preferably, each aliphatic group contains not more than four carbon atoms. Hydrocarbon aliphatic groups (i.e., alkyl, alkenyl, and both saturated and olefinically unsaturated alkylene groups), and these groups substituted by halogen, are most preferred.

While the term "halogen" includes all of the four halogen atoms, the middle halogens—i.e., bromine and chlorine—are preferred.

The esters of this invention having the highest insecticidal activity are those wherein R' is unsubstituted alkyl of up to four carbon atoms, X is oxygen, R is ethylene, R'' is alkylene of from one to two carbon atoms, and the group $R^0$ of the acyl group is alkyl of from one to six carbon atoms.

Therefore the preferred esters of the invention are the O,O-dialkyl, O-2-acyloxymethylthioethyl phosphorothionates having the general formula:

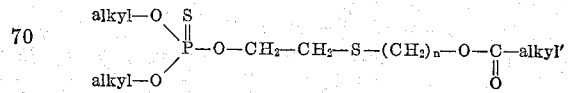

wherein alkyl is alkyl from one to four carbon atoms, $n$ is one or two and alkyl' is alkyl of from one to six carbon atoms. Most preferably, $n$ is one.

The esters of the invention may readily be prepared by reacting a diesterphosphorothionochloridate

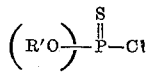

with an (acyloxyaliphaticthio)aliphatic alcohol, acyl—O—R"—S—R—X—H, where X is oxygen, or with a corresponding (acyloxyaliphaticthio)thioaliphatic alcohol, where X represents a sulfur atom, wherein the symbols have the respective general and preferred meanings set out hereinbefore.

These alcohols and thioalcohols are also believed to be novel. In these compounds X preferably represents an oxygen atom, R preferably represents an unsubstituted ethylene radical, R" preferably represents an unsubstituted methylene or ethylene radical, and "acyl" is the acyl residue of an aliphatic carboxylic acid. The preferred alcohols therefore have the following general formula:

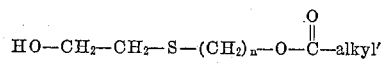

wherein the symbols have the respective meanings already set out. Preferably, $n$ is one.

Since the preferred esters and alcohols of this invention are those wherein the groups R and R" are each alkylene and the group $R^0$ is alkyl, the preparation of such alcohols and esters will be illustrated. It is to be understood that this limitation is for the purpose of illustration only, and that others of the alcohols and esters are prepared by substituting the appropriate reactants.

These alcohols may be considered 2-hydroxyaliphatic-thioaliphatic esters of carboxylic acids. They are conveniently prepared by reacting an alkali metal with an approximately stoichiometric amount of a mercaptoalkanol, or dithioglycol, then adding an approximately stoichiometric amount of halogenated ester. The reactions:

(1)   $M + HX—R—SH \rightarrow HX—R—S—M$ (2)   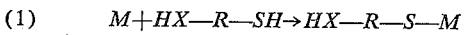
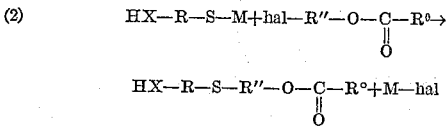

wherein M is the alkali metal, preferably sodium, and hal is halogen, preferably chlorine.

Preferably the alkali metal is dissolved in an alcohol, such as ethanol. Both reactions should be carried out under anhydrous conditions, and preferably oxygen is excluded—as by conducting the reactions in an atmosphere of nitrogen. The reaction of the alkali metal with the mercaptoalkanol or dithioglycol is conveniently conducted at a temperature of from about 0° C. to about 50° C., room temperatures—i.e., from about 15° C. to about 30° C.—being quite suitable. The reaction of the metal derivative of the mercaptoalkanol or dithioglycol and the halogenated ester preferably is conducted at a temperature of from about 30° C. to about 50° C., higher temperatures tending to cause undue decomposition of the product.

The product is worked up by adding water to the reaction mixture, extracting the product with a suitable selective solvent, such as diethyl ether, drying the extract solution, then removing the solvent by distillation.

The product—the acyloxyalkylthioalkanol or (acyloxyalkylthio)thioalkanol then preferably is reacted with a phosphorus compound having the general formula

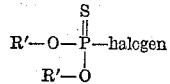

to form the desired derivative:

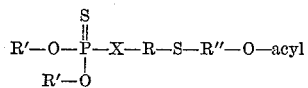

Preferably, the halogen is chlorine.

The reaction should be carried out under anhydrous conditions. The reaction is conveniently conducted by mixing the reactants at room temperature, then heating or cooling as may be necessary to maintain the reaction temperature at about 50° C. to about 70° C. The reaction is conducted in the presence of a hydrogen halide acceptor, an organic tertiary nitrogen base such as pyridine, or an alkyl-substituted pyridine such as lutidine being preferred for this purpose. The reaction may be conducted in the presence of an inert solvent, such as an ether, a halogenated hydrocarbon such as carbon tetrachloride, or a liquid aliphatic or aromatic hydrocarbon, such as hexane, benzene, xylenes or the like, to advantage in some cases, but a solvent may be omitted if one or more of the reactants are liquid. After the reaction is completed, any precipitate of nitrogen base hydrohalide is filtered off, and the solvent, if used, is removed by distillation.

The S-acyloxyalkylthioalkyl phosphorothiolates and phosphorothiolothionates of this invention can be prepared in other ways. For example, the 2-hydroxyalkylthioalkyl esters shown hereinbefore can be reacted with a phosphorus thiohalide, $P(S)(halogen)_3$, preferably in the presence of a hydrogen halide acceptor, or a salt of the 2-hydroxyalkylthioalkyl ester, preferably the alkali metal, can be used, the reaction proceeding to form the intermediate dihalides according to one of the equations:

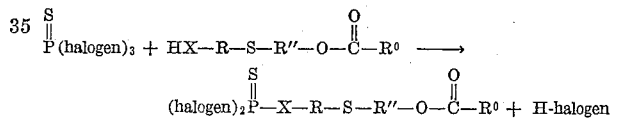

or

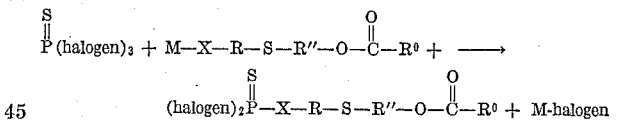

wherein M is the metal, and the other symbols have the respective meanings already set out herein.

The intermediate dihalides then are reacted with a hydroxy compound or compounds, R'OH, R' having the meaning set out hereinbefore, preferably in the presence of a hydrogen halide acceptor, or with a salt, preferably an alkali metal salt, of said hydroxy compound(s), to give the desired product.

In yet another process, the compound $(R'O)_2P(S)(halogen)$ already described herein, is reacted with the mercaptoalcohol or dithioglycol, according to the equation:

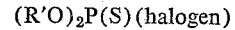
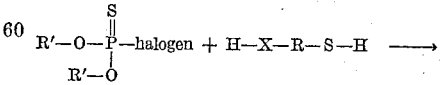

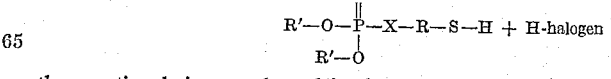

the reaction being conducted in the presence of a hydrogen halide acceptor, then this thioalcohol is reacted with alkali metal, and the alkali metal derivative is reacted with halogenated ester, as has already been set out herein.

All of the reactions set out above should be carried out under anhydrous conditions. An inert solvent, such as ether, halogenated hydrocarbons such as carbon tetrachloride, or a liquid aliphatic or aromatic hydrocarbon, such as hexane, benzene, xylenes or the like, may be employed to advantage in some cases, but may be omitted if one or more of the reactants are liquid. The other reactions described above are, in general, effected at about 50° C. to 80° C.

When reaction is complete, any precipitate formed can be filtered off and any solvent or other volatile material removed by distillation, preferably under reduced pressure. The residual esters are in general liquids. Some are sufficiently heat-stable to allow distillation in a high vacuum. Less stable liquids can be purified by thorough washing with water, drying and warming in a high vacuum to remove volatile impurities. Solid esters can be purified by recrystallization.

In describing the foregoing processes for preparing the compounds of the invention, extended descriptions of the suitable reactants, including listing of numbers of species of the suitable reactants, have not been included because it is felt that such extended descriptions would be undesirable because they would increase the length of this specification and the complexity of descriptions of the processes without serving any useful purpose, and such detailed descriptions are believed unnecessary to understanding of the performance of those processes. The reactants, accordingly, have been described in terms of their general structure, it being intended that detailed descriptions are provided by means of the various symbols used, the meanings of those symbols having been set out in detail in the description of the new compounds of the invention.

The following examples illustrate the novel compounds of the invention and a process for their preparation, the parts by weight (p.b.w.) and parts by volume (p.b.v.) bearing the same relation as the kilogram bears to the liter.

EXAMPLE I (a) *Preparation of 2-Hydroxyethyl Thiomethyl n-Butyrate*

2.4 p.b.w. of sodium were dissolved in 100 p.b.v. of absolute ethanol and to this solution 8.2 p.b.w. of 2-mercaptoethanol were added with stirring under an atmosphere of nitrogen. 14.3 p.b.w. of chloromethyl n-butyrate diluted with its own volume of ethanol was then added to the stirred solution, the temperature of the reaction mixture being kept below 50° C. by external cooling. After standing overnight the solution was diluted with 750 p.b.v. of water, extracted four times with 200 p.b.v. portions of ether and the combined ether extracts dried over anhydrous magnesium sulfate. The ether and other low-boiling products were removed by distillation at 0.003 millimeter mercury pressure and a bath temperature of 65° C., to give 12 p.b.w. (65% yield) of 2-hydroxyethylthiomethyl n-butyrate, identified by elemental analysis as follows:

|  | Analysis—Percent by weight | | |
| --- | --- | --- | --- |
|  | C | H | S |
| Theoretical | 47.2 | 7.86 | 18.0 |
| Found | 46.7 | 8.07 | 17.6 |

(b) *Preparation of O,O-Diethyl-O-2-n-Butyryloxymethylthioethyl Phosphorothionate*

10.5 p.b.w. of 2-hydroxyethylthiomethyl n-butyrate and 11.2 p.b.w. of O,O-diethyl phosphorochloridothionate were mixed and to this mixture 4.7 p.b.w. of pyridine was added gradually with stirring. The temperature rose slowly to 35° C. and when the exothermic reaction had ceased the mixture was heated to 60° C. in a water bath for two hours. After standing overnight it was taken up in ether, washed twice with water, and dried over anhydrous magnesium sulfate. The ether and unreacted starting materials were removed by distillation at 0.003 mm. Hg and a bath temperature of 64° C. to give the 15 p.b.w. (77%) yield of O,O-diethyl-O-2-butyryloxymethylthioethyl phosphorothionate—a pale yellow oil $n_D^{19}$=1.4945—identified by elemental analysis as follows:

|  | Analysis—Percent by weight | | |
| --- | --- | --- | --- |
|  | C | H | S |
| Theoretical | 40.0 | 6.97 | 19.4 |
| Found | 40.3 | 7.26 | 19.0 |

EXAMPLE II

Following the same procedure as described in Example I(a) except that an equimolar proportion of chloromethyl acetate was used in place of the chloromethyl n-butyrate, a 65% yield of 2-hydroxyethylthiomethyl acetate was obtained. This compound was then reacted with an equimolar quantity of O,O-diethyl phosphorochloridothionate under the same reaction conditions as described in Example I(b). The product was a 90% yield of O,O-diethyl-O-2-acetoxymethylthioethyl phosphorothionate—a yellow oil $n_D^{18}$=1.5102—identified by elemental analysis:

|  | Analysis—Percent by weight | | |
| --- | --- | --- | --- |
|  | C | H | S |
| Theoretical | 35.7 | 6.3 | 21.2 |
| Found | 36.9 | 6.6 | 23.5 |

EXAMPLE III

Following the same procedure as described in Example I(a) except that an equimolar proportion of chloromethyl n-propionate was used in place of the chloromethyl n-butyrate, a 65% yield of 2-hydroxyethylthiomethyl n-propionate was obtained. This compound was then reacted with an equimolar quantity of O,O-diethylphosphorochloridothionate under the same reaction conditions as described in Example I(b). The product was a 72% yield of O,O - diethyl - O - 2 - n - propionyloxymethylthioethyl phosphorothionate—a yellow oil $n_D^{18}$=1.5017—identified by elemental analysis:

|  | Analysis—Percent by weight | | |
| --- | --- | --- | --- |
|  | C | H | S |
| Theoretical | 39.0 | 6.6 | 20.3 |
| Found | 40.8 | 7.0 | 21.5 |

EXAMPLE IV

Following the same procedure as described in Example I(a) except that an equimolar proportion of chloromethyl-isobutyrate was used in place of the chloromethyl n-butyrate, a 65% yield of 2-hydroxyethylthiomethyl-isobutyrate was obtained. This compound was then reacted with an equimolar quantity of O,O-diethylphosphorochloridothionate under the same reaction conditions as described in Example I(b). The product was an 89% yield of O,O-diethyl-O-2-isobutyryloxymethylthioethyl phosphorothionate—a yellow oil $n_D^{19}$=1.4938—identified by elemental analysis:

|  | Analysis—Percent by weight | | |
| --- | --- | --- | --- |
|  | C | H | S |
| Theoretical | 40.0 | 7.0 | 19.4 |
| Found | 39.2 | 7.1 | 20.5 |

In a similar manner, O,O-dimethyl O-2-(2-benzoyloxyethylthio)ethyl phosphorothioate is prepared by reacting O,O-dimethyl phosphorochloridothionate with 2-(2-benzoyloxyethylthio)ethanol which has been prepared by reaction of the sodium salt of 2-mercaptoethanol and 2-chloroethylbenzoate; O-methyl O-ethyl S-2-(acetoxymethylthio)ethyl phosphorothiolothionate is prepared by reacting O-methyl O-ethyl phosphorochloridothionate with 2-(acetoxyethylthio)ethanethiol which has been prepared by reacting chloromethyl acetate with the sodium salt of 1,2-ethanedithiol; O-methyl O-phenyl O-2-(2-chloroacetoxyethylthio)propylphosphorothionate is prepared by reacting O-methyl O-phenyl phosphorochloridothionate with 2-(2-chloroacetoxyethylthio)propan - 1 - ol which has been prepared by reacting the 2-bromoethyl ester of chloroacetic acid with the sodium salt of 2-mercaptopropan-1-ol. Still others of the compounds of the invention are prepared as set out in Table I.

By the term "insects" is meant not only the members of the class insecta, but also related to similar organisms belonging to allied classes of arthropods, and including mites, ticks, spiders, wood lice, and the like.

The new insecticidal compositions include liquid solutions and dispersions of the active ingredients in a suitable liquid carrier, these compositions being suitable for application in the form of sprays or dips, or by means of brushing. Suitable liquid carriers are those which are well known in the art to be non-toxic to plants, and include such materials as kerosene, or similar light mineral oil distillates of intermediate viscosity and volatility. In addition to such carriers, other adjuvants may be employed to enhance the effectiveness of the toxic materials. Such other adjuvants include spreading or wetting agents such as fatty acid soaps, rosin salts, saponins, gelatin, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines, and the like. The solution of the toxic material may be dispersed or emulsified in water, and the resulting dispersion or emulsion applied as the spray.

TABLE I

| Precursors | | |
|---|---|---|
| (CH₃O)₂P(=S)Cl | Cl–CH₂–O–C(=O)–CH₃ | HS–C₂H₄–SH |
| (C₆H₅O)₂P(=S)Cl | Cl₂CH–O–C(=O)–CH₃ | HO–C₂H₄–SH |
| (C₂H₅O)₂P(=O)Cl | Cl–CH₂–O–C(=O)–H | HO–CH(CH₃)–CH₂–SH |
| (CH₃O)₂P(=S)Cl | Cl–CH₂–O–SO₂–C₆H₄–CH₃ | HO–C₂H₄–SH |
| (CH₃O)(NO₂–C₆H₄–O)P(=S)Cl | Cl–CH₂–O–C(=O)–CH₃ | HO–C₂H₄–SH |

| Intermediate | Product |
|---|---|
| HS–C₂H₄–S–CH₂–O–C(=O)–CH₃ | (CH₃O)₂P(=S)–S–C₂H₄–S–CH₂–O–C(=O)–CH₃ |
| HO–C₂H₄–S–CHCl–O–C(=O)–CH₃ | (C₆H₅O)₂P(=O)–O–C₂H₄–S–CHCl–O–C(=O)–CH₃ |
| HO–CH(CH₃)–CH₂–S–CH₂–O–C(=O)–H | (C₂H₅O)₂P(=O)–O–CH(CH₃)–CH₂–S–CH₂–O–C(=O)–H |
| HO–C₂H₄–S–CH₂–O–SO₂–C₆H₄–CH₃ | (CH₃O)₂P(=O)–O–C₂H₄–S–CH₂–O–SO₂–C₆H₄–CH₃ |
| HO–C₂H₄–S–CH₂–O–C(=O)–CH₃ | (CH₃O)(NO₂–C₆H₄–O)P(=S)–O–C₂H₄–S–CH₂–O–C(=O)–CH₃ |

The esters of phosphorothionic acids and phosphorothiolothionic acids provided by this invention are characterized by high toxicity toward insects, so that the invention also includes insecticidal compositions containing those esters.

Since these insecticidal compositions exhibit substantially no toxicity toward plant life, they can be effectively used for eradication of insects and similar pests and for protection of plant life against the ravages of insects.

The new insecticidal compositions may be in the form of finely divided solids, the active material being combined with a finely divided solid carrier such as talc, bentonite, lime, gypsum, pyrophillite or the like. The compositions may also contain sticking agents, emulsifying agents, or other materials which enhance the effectiveness of the toxic materials.

If desired, the composition may be in the form of an aerosol, the toxic material being dispersed into the air, or atomized into a spray, by means of a compressed gas.

The concentration of toxic material in our insecticidal compositions will depend on many factors, such as the particular toxic material or materials which are used, the carrier used, the method and conditions of application, the insect species to be controlled, etc., the proper consideration of these factors being within the skill of those versed in the art. In general, the toxic materials hereinbefore-described will be effective in concentrations of from about 0.01% to about 0.5% by weight, based upon the total weight of the composition, although, depending upon the circumstances, as little as about 0.001% or as much as 2% or even more of the toxic material may be employed effectively.

In our new compositions, the toxic agents hereinbefore-described may be employed as the sole toxic ingredient, or they may be employed in conjunction with other insecticidally active materials. Such other insecticidally active materials include, without being limited to, the naturally occurring insecticides, such as pyrethrum, rotenone, sabidilla, and the like, as well as synthetic materials such as compounds of arsenic, lead, and/or fluorine; DDT, benzene hexachloride, thiodiphenylamine, cyanides, O,O-diethyl-O-p-nitrophenyl thiophosphate, azobenzene, and the like.

Particularly suitable compounds of the invention for use in the insecticidal compositions of the invention are the following:

(1) O,O-diethyl O-2-acetoxymethylthioethyl phosphorothionate

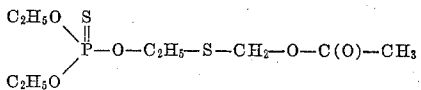

(2) O,O-diethyl O-2-propionyloxymethylthioethyl phosphorothionate

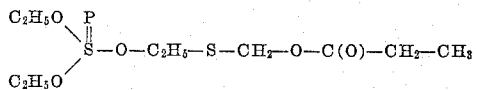

(3) O,O-diethyl O-2-butyryloxymethylthioethyl phosphorothionate

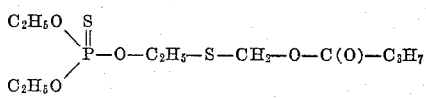

(4) O,O-diethyl O-2-isobutyryloxymethylthioethyl phosphorothionate

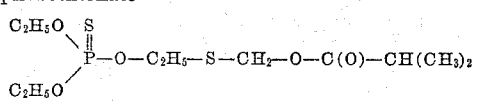

these being typical species of the preferred subgenus described in column 2, lines 66–71 and column 3, lines 1–3.

The formulation and use of insecticidal compositions of this invention is illustrated in the following examples, which illustrate the preparation and use of typical insecticidal compositions of this invention.

A 1% by weight solution in acetone of each of compounds 1 through 4 was prepared.

The solution was applied topically to twenty adult female house flies, *Musca domestica*, at the rate of 0.01 milliliter of solution per fly.

To 100 milliliters of water containing 0.1 milliliter of the test solution were added twenty mosquito larvae, *Aedes aegypti* (yellow fever mosquito).

Hardened filter paper, 9 centimeters in diameter, was placed in a Petri dish and evenly impregnated with 1 milliliter of the test solution and the solvent allowed to evaporate. Five adult male German cockroaches, *Blatella germanica*, were exposed to one paper, and ten adult flour beetles, *Tribolium confusum*, to another.

In tests against diamond-back moth larvae, *Plutella maculipennis* (Curtis), and pea aphids, *Acyrthosiphon pisum* (Harns), turnip and broad bean plants, trimmed to one leaf each, were sprayed on the under surface of the leaf with a 1.6% by weight suspension of the chemical in a 0.25% by weight aqueous solution of Triton X 100 as wetting agent, prepared in a micro-wet grinder. Spraying was effected with a paint-type spray gun delivering 17 gallons per acre at 50 pounds per square inch pressure, the plants passing under the spray on a moving belt. Ten moth larvae and ten aphids respectively were placed on the sprayed leaves and each plant then enclosed in a glass cylinder fitted at one end with a muslin cap.

In tests against red spider mite, *Tetranychus telarius* (Linn.), discs 6 centimeters in diameter cut from previously infested French bean leaves were placed on damp filter paper and sprayed at the same time as the turnips and bean plants.

For comparative purposes, similar tests were carried out against red spider mite using the standard insecticide methyl parathion (MP).

In all these tests, mortality counts were made 24 and 48 hours later. All four of the test compounds resulted in 100% kill of each of the test insects.

We claim as our invention:

1. O,O-diethyl O-2-acetoxymethylthioethyl phosphorothionate.

2. O,O-diethyl O-2-propionyloxymethylthioethyl phosphorothionate.

3. O,O-diethyl O-2-butyryloxymethylthioethyl phosphorothionate.

4. O,O-diethyl O-2-isobutyryloxymethylthioethyl phosphorothionate.

5. The ester of the formula

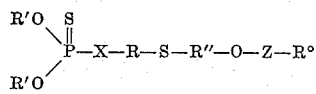

wherein X is selected from the group consisting of oxygen and sulfur, R and R'' are each alkylene of up to 12 carbon atoms, R' is selected from the group consisting of alkyl of up to 10 carbon atoms, phenyl and nitrophenyl, Z is selected from the group consisting of $$-\underset{\underset{\text{O}}{\|}}{\text{C}}-$$

and —SO$_2$— and R$^0$ is selected from the group consisting of the hydrogen atom, alkyl of up to 6 carbon atoms, phenyl, tolyl and halomethyl.

6. As a new composition of matter, an insecticidal composition comprising a compound of claim 5 as active ingredient together with an insecticidal adjuvant as carrier therefor.

7. The method of combating insects which comprises subjecting the insects to the action of the compound of claim 5.

8. The ester of the formula

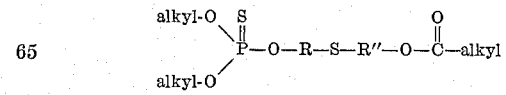

wherein alkyl is an unsubstituted straight-chain alkyl of 1 to 4 carbon atoms, R and R'' are each alkylene of up to 12 carbon atoms and alkyl' is an unsubstituted straight-chain alkyl of 1 to 6 carbon atoms.

9. As a new composition of matter, an insecticidal composition comprising a compound of claim 8 as active ingredient together with an insecticidal adjuvant as carrier therefor.

10. The ester of the formula

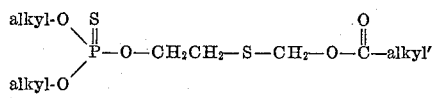

wherein alkyl is an unsubstituted straight-chain alkyl of 1 to 4 carbon atoms and alkyl' is an unsubstituted straight-chain alkyl of 1 to 6 carbon atoms.

11. As a new composition of matter, an insecticidal composition comprising a compound of claim 10 as active ingredient together with an insecticidal adjuvant as carrier therefor.

12. As a new compound, a phosphorus-containing ester of the formula

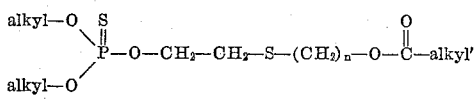

wherein alkyl is an unsubstituted straight-chain alkyl of 1 to 4 carbon atoms, alkyl' is an unsubstituted straight-chain alkyl of 1 to 6 carbon atoms, and $n$ is a whole positive number from 1 to 2.

13. As a new composition of matter, an insecticidal composition comprising a compound of claim 12 as active ingredient together with an insecticidal adjuvant as carrier therefor.

14. The method of combating insects which comprises subjecting the insects to the action of the compound of claim 12.

15. As a new composition of matter, an insecticidal composition comprising O,O-diethyl O-2-acetoxymethylthioethyl phosphorothionate as active ingredient, together with an insecticidal adjuvant as carrier therefor.

16. As a new composition of matter, an insecticidal composition comprising O,O-diethyl O-2-propionyloxymethylthioethyl phosphorothionate as active ingredient, together with an insecticidal adjuvant as carrier therefor.

17. As a new composition of matter, an insecticidal composition comprising O,O-diethyl O-2-butyryloxymethylthioethyl phosphorothionate as active ingredient, together with an insecticidal adjuvant as carrier therefor.

18. As a new composition of matter, an insecticidal composition comprising O,O-diethyl O-2-isobutyryloxymethylthioethyl phosphorothionate as active ingredient, together with an insecticidal adjuvant as carrier therefor.

References Cited in the file of this patent

FOREIGN PATENTS 1,014,988    Germany _____ Sept. 5, 1957